United States Patent
Ju (10) Patent No.: US 7,630,436 B2
(45) Date of Patent: Dec. 8, 2009

(54) VIDEO PREDICTIVE DECODING METHOD AND APPARATUS

(75) Inventor: Chi-Cheng Ju, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 823 days.

(21) Appl. No.: 10/711,391

(22) Filed: Sep. 15, 2004

(65) Prior Publication Data

US 2005/0063460 A1    Mar. 24, 2005

(30) Foreign Application Priority Data

Sep. 19, 2003    (TW)    ............... 92125905 A (51) Int. Cl.
*H04B 1/66*    (2006.01)

(52) U.S. Cl. ............... 375/240.03; 375/240.25; 375/240.26; 375/240.2; 375/240.12; 382/233; 382/235; 382/251; 382/250; 382/238

(58) Field of Classification Search ............ 375/240.03, 375/240.25, 240.26, 240.2, 240.12; 382/233, 382/251, 250, 235, 238
See application file for complete search history.

(56) References Cited

U.S. PATENT DOCUMENTS 5,650,860 A * 7/1997 Uz ............... 382/253
6,385,242 B1 * 5/2002 Chen ............... 375/240.03

\* cited by examiner

*Primary Examiner*—Shawn An
(74) *Attorney, Agent, or Firm*—Winston Hsu (57) ABSTRACT

A video predictive decoding method and apparatus for predicting a current block of a picture. The method includes storing at least one previous product in a memory. The previous product corresponds to a block of a plurality of blocks of the picture. The previous product is the product of a quantized AC coefficient and a quantization scale of the block that the previous product corresponds to. The method further includes determining which block to use as a prediction block from the plurality of blocks, reading from the memory at least one previous product corresponding to the prediction block, and calculating at least one quantized AC coefficient of the current block using the at least one previous product read from the memory.

12 Claims, 5 Drawing Sheets

VIDEO PREDICTIVE DECODING METHOD AND APPARATUS

BACKGROUND

The present invention relates to a video predictive decoding method and related apparatus, and more particularly, to a quantized AC coefficient calculation method and related apparatus.

Recently, new encoding standards have been established to provide a flexible framework and an open set of coding tools for communication, access, and manipulation of digital audio/visual data. For example, MPEG4 (Moving Picture Experts Group/IV) is one of the above-mentioned new coding standards, and the tools for MPEG4 support a wide range of features. The flexible framework of MPEG4 supports various combinations of coding tools and their corresponding functionalities for applications required by the computer, telecommunication, and entertainment industries.

Figure 1:
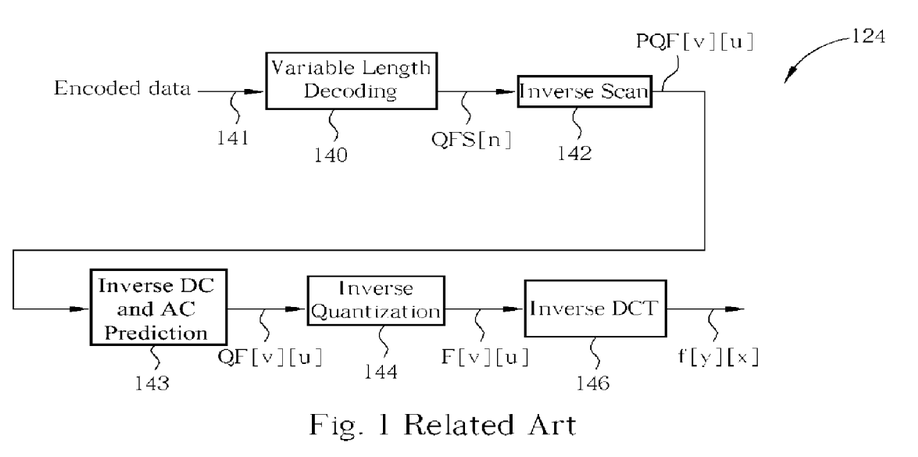
FIG. 1 is a block diagram of a video texture decoding apparatus according to the related art.

Please refer to FIG. 1 (taken from the MPEG4 specification, also known as ISO/IEC 14496-2) showing a block diagram of a video texture decoding device 124 according to the related art. The video texture decoding device 124 is used for decoding texture data encoded in the above-mentioned MPEG4 specification. In regards to the two-dimensional array indexes [q, p], "q" denotes a vertical index and "p" denotes a horizontal index.

As shown in FIG. 1, the texture encoded data inputted into the texture decoding device 124 through the texture decoding input 141 is converted into the following data sequentially: variable length decoding data QFS[n], inverse scan decoding data PQF[v][u], quantized DC (Direct Current) and AC (Alternating Current) coefficients QF[v][u], DCT (Discrete Cosine Transform) coefficients F[v][u], and video texture coefficients f[y][x]. Each conversion is completed with it respective parts—the Variable Length Decoding unit 140, the Inverse Scan unit 142, the Inverse DC and AC Prediction unit 143, the Inverse Quantization unit 144, and the Inverse DCT unit 146. For further details of the above-mentioned related art, please refer to the MPEG4 specification and related documents.

The following descriptions relate to processes of the Inverse DC and AC Prediction unit 143, and more particularly, to calculations concerning the quantized AC coefficients QF[v][u] (specifically, the quantized coefficients QF[v][u] with non-zero indexes [v, u]). Please note that sometimes a subscripted character will be present such as in $QF_X$[v][u]. The subscripted character simply denotes which block the term QF[v][u] belongs to, so the coefficients of block (X) would be termed the coefficients $QF_X$[v][u].

Figure 2:
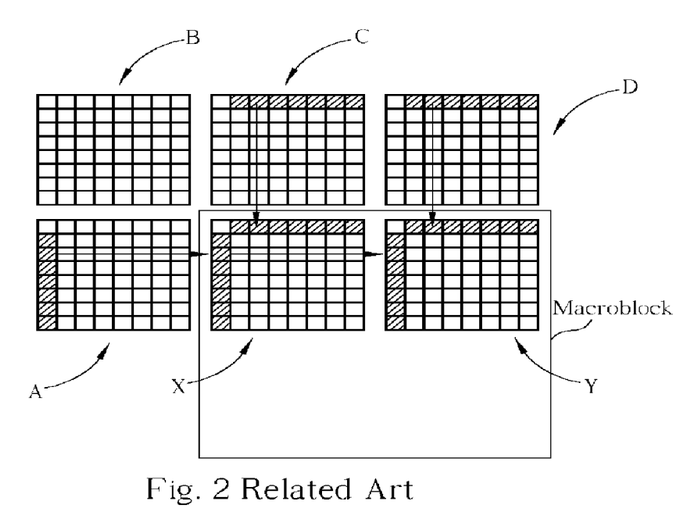
FIG. 2 is a diagram of Inverse AC Prediction calculation directions of the Inverse DC and AC Prediction unit in FIG. 1.

Please refer to FIG. 2 showing a diagram of Inverse AC Prediction calculation directions of the Inverse DC and AC Prediction unit 143 in FIG. 1. The calculation directions shown are the directions of prediction calculations of the first row quantized AC coefficients $QF_X$[v][u] (v=0 and u=1~7) and the first column quantized AC coefficients $QF_X$[v][u] (v=1~7 and u=0) of related blocks. The calculation of the quantized AC coefficients $QF_X$[v][u] of a current block (X), which is being decoded currently, is described in the following.

First, choose a previously decoded block to serve as a prediction block from either a left adjacent block (A) of the current block (X) or an upper adjacent block (C) of the current block (X). The choice of the prediction block for the quantized AC coefficient depends on the direction of the prediction block that was chosen for the quantized DC coefficient with respect to the current block. That is, if the left prediction block (A) is used during the prediction calculation of the quantized DC coefficient $QF_X$[0][0], the left prediction block (A) will also be used during the prediction calculation of the quantized AC coefficients $QF_X$[v][u]; if the upper prediction block (C) is used during the prediction calculation of the quantized DC coefficient $QF_X$[0][0], the upper prediction block (C) will also be used during the prediction calculation of the quantized AC coefficients $QF_X$[v][u]. Secondly, calculate the quantized AC coefficients $QF_X$[v][u] according to the quantized AC coefficients of the block chosen to serve as the prediction block. That is to say, calculate the quantized AC coefficients $QF_X$[v][u] according to either quantized AC coefficients $QF_A$[v][u] or $QF_C$[v][u].

For another example, in the case that the block currently being decoded is now block (Y), when calculating quantized AC coefficients of a current block (Y), one still first chooses a previously decoded block to serve as a prediction block from either a left adjacent block of the current block (Y) or an upper adjacent block of the current block (Y); in this case the left adjacent block is block (X) and the upper adjacent block is block (D). Then calculate the quantized AC coefficients $QF_Y$[v][u] according to the quantized AC coefficients of the block chosen to serve as the prediction block. That is to say, calculate the quantized AC coefficients $QF_Y$[v][u] according to either quantized AC coefficients $QF_X$[v][u] or $QF_D$[v][u].

Using the method shown in FIG. 2, the blocks of a picture can be decoded one by one, wherein each block is a sub set of a macroblock. The macroblock shown in FIG. 2 consists of 4 blocks (2 blocks are not shown in FIG. 2), wherein each block includes 8*8 coefficients representing components of the image related to the block.

Figure 3:
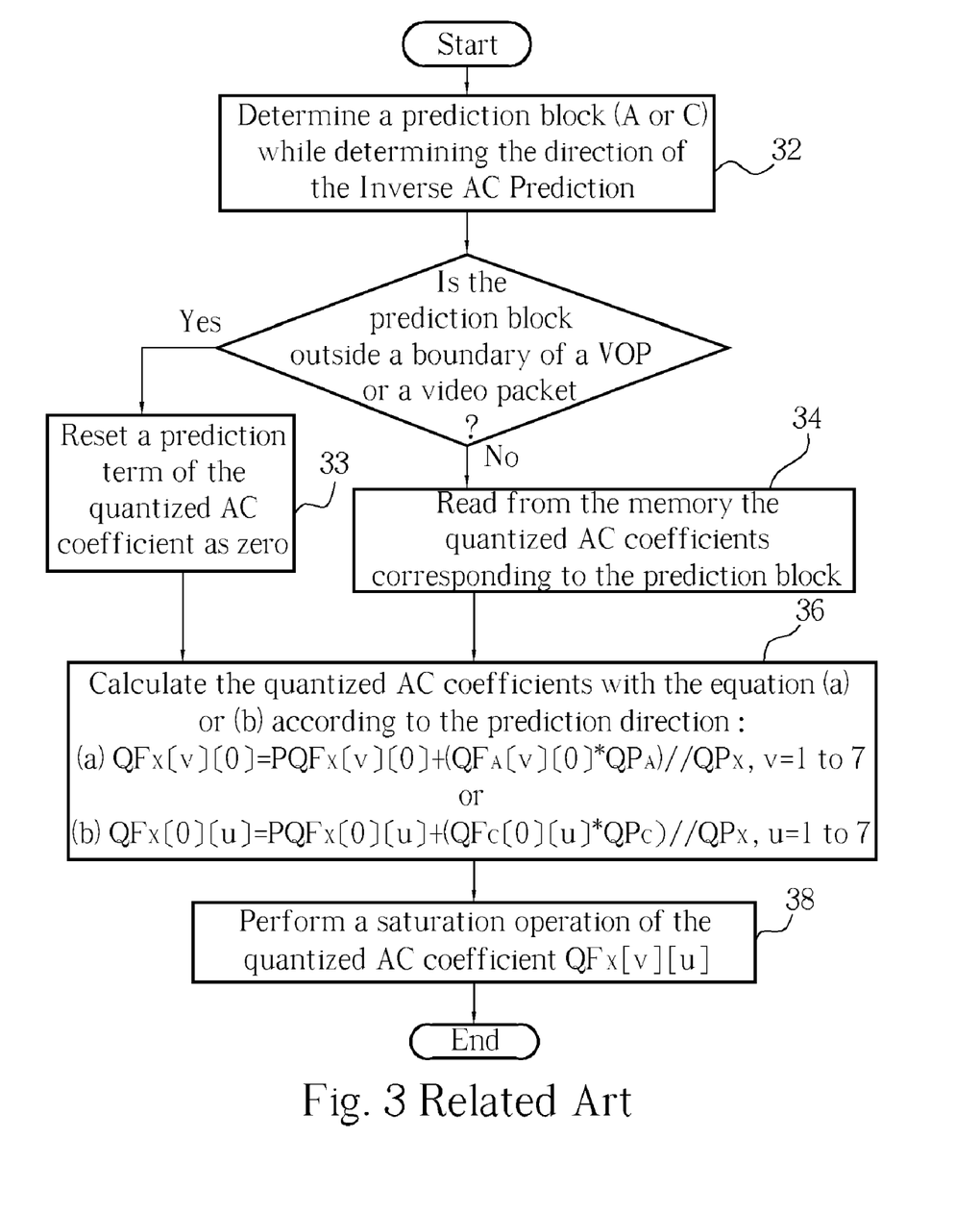
FIG. 3 is a flowchart diagram of an Inverse AC Prediction method according to the related art.
Figure 4:
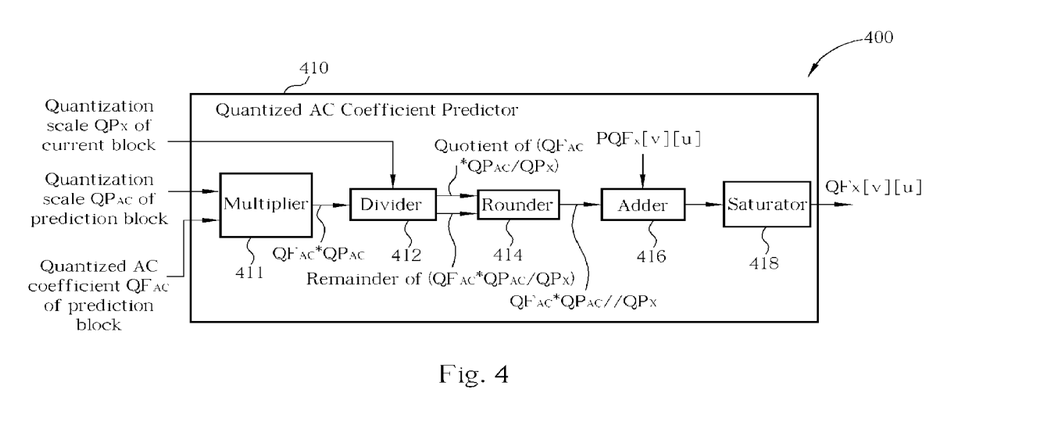
FIG. 4 is a circuit block diagram of the Inverse AC Prediction method of FIG. 3.

Please refer to both FIG. 3 and FIG. 4. FIG. 3 is a flowchart diagram of an Inverse AC Prediction method according to the related art while FIG. 4 is a circuit block diagram of the Inverse AC Prediction method of FIG. 3. The circuit 410 of FIG. 4 corresponds to the matrix operation of equation (a) and equation (b) of FIG. 3. In FIG. 3 and FIG. 4, $PQF_X$[v][u] denotes Inverse Scan calculation results generated during a previous-stage decoding process of the current block (X), and the operator "//" denotes a division operation with the result thereof rounded to the nearest integer. QP denotes a quantization scale of a macroblock during the encoding process, and accordingly denotes the quantization scale of each block in the macroblock. Therefore, $QP_X$, $QP_A$, and $QP_C$ in FIG. 3 and FIG. 4 respectively denote the quantization scales of the blocks X, A, and C. Furthermore, $QF_{AC}$ denotes $QF_A$ or $QF_C$, and $QP_{AC}$ denotes $QP_A$ or $QP_C$, while $QF_{AC}*QP_{AC}$ denotes $QF_A*QP_A$ or $QF_C*QP_C$. Please note that these and previously mentioned parameter definitions are related to FIG. 2 and will not be repeated.

As shown in FIG. 3 and FIG. 4, during the matrix operations of the Inverse AC Prediction process of the related art, performing a multiplication operation, a division operation, a rounding operation, an addition operation, and a saturation operation respectively with a multiplier 411, a divider 412, a rounder 414, an adder 416, and a saturator 418 are required. However, the operations of the Inverse AC Prediction process needs to be performed for each block in each picture so a large number of calculations are involved. It is therefore desirable to reduce the required calculations so as to achieve better efficiency of the decoding process.

SUMMARY

It is therefore an objective of the invention to provide a video predictive decoding method and related apparatus to solve the above-mentioned problem.

The present invention provides a video decoding method for predicting a current block of a picture. In one embodiment, the method includes storing at least one previous product in a memory. The previous product corresponds to a block of a plurality of blocks of the picture. The previous product is the product of a quantized AC coefficient and a quantization scale of the block that the previous product corresponds to. The method further includes determining which block to use as a prediction block from the plurality of blocks, reading from the memory at least one previous product corresponding to the prediction block, and calculating at least one quantized AC coefficient of the current block using the at least one previous product read from the memory, wherein each quantized AC coefficient is a discrete cosine transform coefficient corresponding to a quantization operation, and the at least one previous product is generated during an inverse quantization operation of the block to which the previous product corresponds.

Along with providing the above-mentioned video decoding method, the embodiment further provides a video decoding device for predicting a current block of a picture. The device includes a storage device for storing at least one previous product, wherein the previous product corresponds to a block of a plurality of blocks of the picture, and the previous product is the product of a quantized AC coefficient and a quantization scale of the block that the previous product corresponds to. The device further includes a divider electrically connected to the storage device for: reading at least one previous product of a prediction block from the plurality of blocks, reading a quantization scale of the current block, and dividing the at least one previous product of the prediction block by the quantization scale of the current block to generate a quotient and a remainder corresponding to the at least one previous product. The device further includes a rounder electrically connected to the divider for converting the quotient into a rounded quotient. The device further includes an adder electrically connected to the rounder for adding the rounded quotient with the inverse scan operation result generated during a previous decoding process of the current block to generate a summation; and a saturator electrically connected to the adder for converting the summation into a quantized AC coefficient of the current block.

One feature of the embodiment is that the video decoding method and device provide better calculation order for a current block, so the required calculation and time for decoding the current block are reduced.

Another advantage of the present invention is that, the previous products used in the better calculation order of the embodiment are the same as those products corresponding to a previous decoded block (that is, the products generated while decoding the previous decoded block). Therefore, no additional calculation is required and the overall decoding time could be reduced.

These and other objectives of the present invention will become obvious to those of ordinary skill in the art after reading the following detailed description of the embodiment that is illustrated in the various figures and drawings.

DETAILED DESCRIPTION

Figure 5:
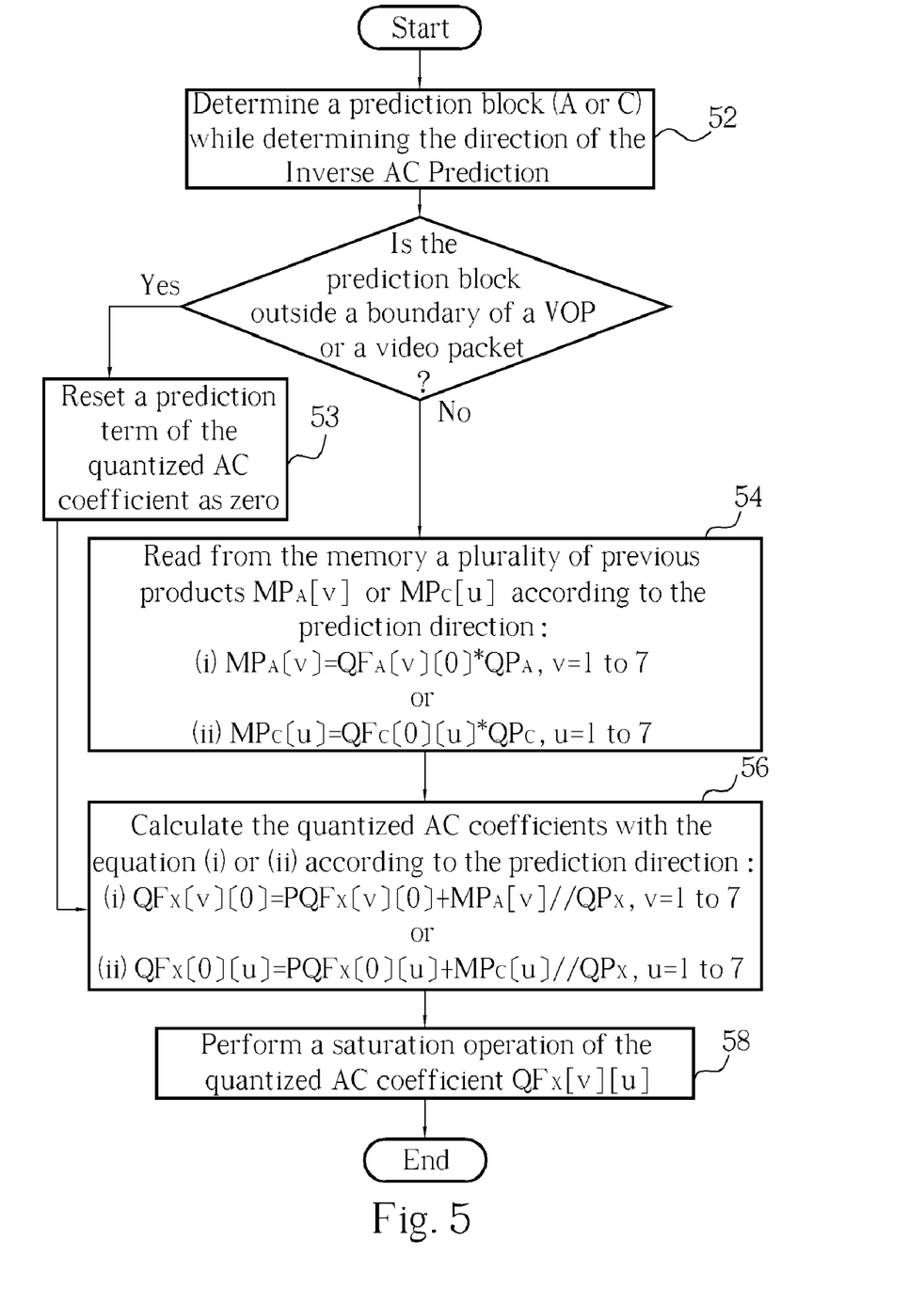
FIG. 5 is a flowchart diagram of the video decoding method according to the embodiment of the present invention.
Figure 6:
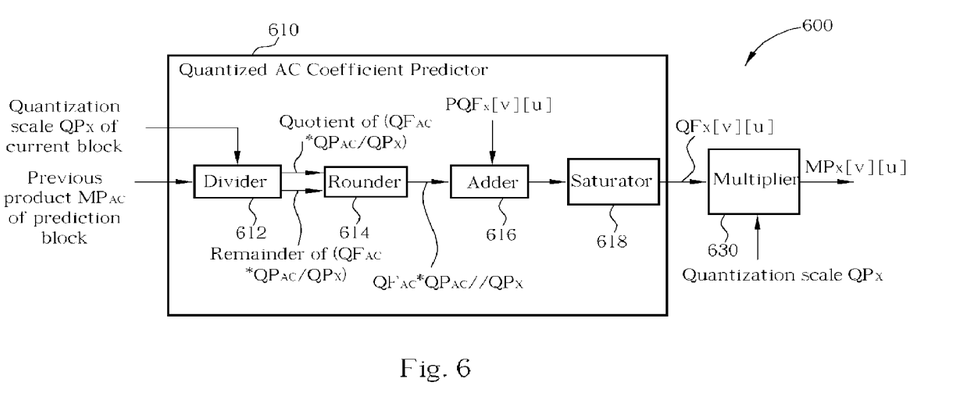
FIG. 6 is a circuit block diagram of the video decoding method of FIG. 5.

In contrast to the method and related device of the related art (shown in FIG. 3 and FIG. 4), the method and related device of the present invention (shown in FIG. 5 and FIG. 6 respectively) can reach the same operational results as those of the Inverse AC (Alternating Current) Prediction operation shown in FIG. 2 with a smaller amount of operations (and thus, requires less calculation and less time). Please refer to FIG. 5 and FIG. 6. FIG. 5 is a flowchart diagram of the video decoding method according to the embodiment while FIG. 6 is a circuit block diagram of the video decoding method of FIG. 5. The Quantized AC Coefficient Predictor 610 in FIG. 6 corresponds to one of the matrix operations of the equations (i) and (ii) of Step 56 in FIG. 5. In FIG. 5 and FIG. 6, QP denotes a quantization scale of a macroblock during the encoding process, and accordingly denotes the quantization scale of each block in the macroblock. A previous product MP[v][u] denotes the product between a quantized AC coefficient QF[v][u] and a quantization scale QP, QF[v][u]*QP, of a block that the previous product corresponds to. Furthermore, $MP_{AC}$ denotes $MP_A$ or $MP_C$, and $QF_{AC}*QP_{AC}$ denotes $QF_A*QP_A$ or $QF_C*QP_C$. Note that the subscripts X, A, C respectively denote the parameters corresponding to the block X, A, and C. Relationships of the related parameters will be described later.

First, the modifications from the method of FIG. 3 into the method of FIG. 5 will be described in the following. According to definition (i) of Step 54 in FIG. 5, the product term $(QF_A[v][0]*QP_A)$ of the equation (a) in FIG. 3 can be defined as the previous product $MP_A[v]$. Therefore, the equation (a) in FIG. 3 can be converted into the equation (i) of Step 56 in FIG. 5. Similarly, according to definition (ii) of Step 54 in FIG. 5, the product term $(QF_C[0][u]*QP_C)$ of the equation (b) in FIG. 3 can be defined as the previous product MPc[u]. Therefore, the equation (b) in FIG. 3 can be converted into the equation (ii) of Step 56 in FIG. 5. In this embodiment, the previous products $MP_A[v]$ and $MP_C[u]$ are stored in a memory in advance so the Steps 34, 36 in FIG. 3 could be changed into Step 54, 56 in FIG. 5. Therefore the method of FIG. 5, as a replacement for the method of FIG. 3, can reach the same operation results as those of the Inverse AC Prediction operation shown in FIG. 2.

Figure 7:
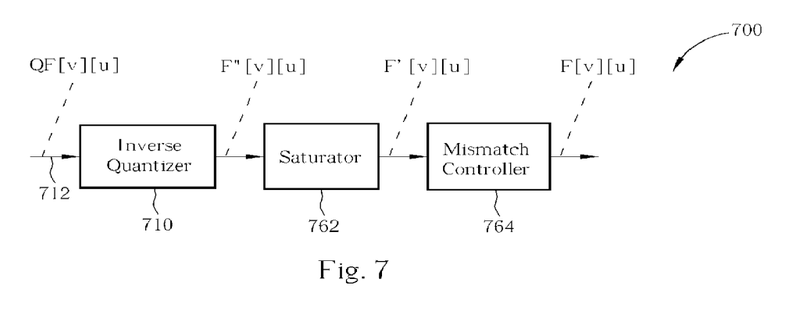
FIG. 7 is a block diagram of the Inverse Quantization unit according to the embodiment of the present invention.

The differences between FIG. 5 and FIG. 3 are described as follows. The multiplication operations during the matrix operations of the equations (a) and (b) in FIG. 3 can be replaced with the previous products $MP_A$ and $MP_C$ during the corresponding operations of the embodiment. That is, the multiplication operations are not needed during the matrix operations of the equations (i) and (ii) in FIG. 5, so the total number of matrix operations can be reduced. Please refer to FIG. 1 and FIG. 5. The operation process shown in FIG. 5 corresponds to the Inverse DC and AC Prediction unit 143 in FIG. 1, and the above-mentioned previous products $MP_A$ and $MP_C$ are generated during a new Inverse Quantization process (a corresponding Inverse Quantization unit 700 is shown in FIG. 7 and will be explained later) of a prediction block (block A or C, to which the previous products $MP_A$ or $MP_C$ corresponds) decoded in advance. Through the rearrangement (to be explained later) of the internal operation order of the Inverse Quantization unit 144 in FIG. 1, the previous products $MP_A$ or $MP_C$ will be those needed in the new Inverse Quantization process. Therefore, the goal of the present invention, reducing the number of calculations (and its corresponding time) relating to the Inverse DC and AC Prediction unit 143 in FIG. 1 is achieved.

Please refer to the embodiment shown in FIG. 5 again. The embodiment provides a video decoding method for predicting a current block (X) of a picture. Although the following steps are described with at least one matrix element case (such as at least one previous product MP[v][u], at least one previous product $MP_A[v]$ or $MP_C[u]$, at least one first column quantized AC coefficient $QF_X[v][0]$ or at least one first row quantized AC coefficient $QF_X[0][u]$ ..., etc.) and these elements indexed by indexes [v, u], however, for the case that using a single matrix element (such as one previous product $MP_A[1]$ or $MP_C[1]$, one first column quantized AC coefficient $QF_X[1][0]$ or one first row quantized AC coefficient $QF_X[0][1]$ ..., etc.) is one way for the implementation of the present invention and for the case that the steps performed with a plurality of matrix elements (such as a plurality of previous product MP[v][u], a plurality of previous product $MP_A[v]$ or $MP_C[u]$, a plurality of first column quantized AC coefficient $QF_X[v][0]$ or a plurality of first row quantized AC coefficient $QF_X[0][u]$ ..., etc.) is another way for the implementation of the present invention to reach better decoding efficiency. The steps of the method are described as follows.

Step 50: Store (as storing in advance, not shown in FIG. 5) at least one previous product MP[v][u] in a memory, wherein the previous product MP[v][u] corresponds to a block of a plurality of blocks of the picture, the previous product MP[v][u] is the product between a quantized AC coefficient QF[v][u] and a quantization scale QP, QF[v][u]*QP, of the block that the previous product corresponds to, and each quantized AC coefficient QF[v][u] is a DCT (Discrete Cosine Transform) coefficient F[v][u] corresponding to a quantization operation (that is, the quantized coefficient QF[v][u] corresponding to indexes [v, u] in Step 50 is substantially the quantized coefficient QF[v][u] in FIG. 1);

Step 52: Determine the direction of the Inverse AC Prediction and determine which block to use as a prediction block from the plurality of blocks, wherein the prediction block is a left adjacent block (A) or an upper adjacent block (C) of the current block;

Step 53: When the block determined to be used as the prediction block is outside a boundary of either a VOP (Video Object Plane) or a video packet corresponding to the picture, directly reset a prediction term $MP_A[v]//QP_X$ or $MP_C[u]//QP_X$ (to be explained later) of the quantized AC coefficient QF[v][u] of the current block as zero to calculate the quantized AC coefficient QF[v][u] of the current block rather than reading the at least one previous product of the prediction block from the memory;

Step 54: Read from the memory at least one previous product $MP_A[v]$ (which is MP[v][0], where v=1~7, in this embodiment) or $MP_C[u]$ (which is MP[0][u], where u=1~7, in this embodiment) corresponding to the prediction block according to the direction of the Inverse AC Prediction (Please remember that a plurality of previous products may be used as shown in FIG. 5, and the use of 7 previous products is employed in this embodiment);

Step 56: Calculate at least one first column quantized AC coefficient $QF_X[v][0]$ or at least one first row quantized AC coefficient $QF_X[0][u]$ of the current block using the at least one previous product $MP_A[v]$ or $MP_C[u]$ read from the memory according to the direction of the Inverse AC Prediction; and Step 58: Perform a saturation operation of the quantized AC coefficient QF [v][u] so the quantized AC coefficient QF [v][u] of the current block can be saturated in a predetermined numerical interval.

In Step 54, when the prediction block is a left adjacent block (A) of the current block, the at least one previous product read is a product $MP_A[v]=QF_A[v][0]*QP_A$ corresponding to the left adjacent block, wherein $QF_A[v][0]$ is a first column quantized AC coefficient of the left adjacent block (A) and $QP_A$ is a quantization scale of the left adjacent block (A); and when the prediction block is a upper adjacent block (C) of the current block, the at least one previous product read is a product $MP_C[u]=QF_C[0][u]*QP_C$ corresponding to the upper adjacent block, wherein $QF_C[0][u]$ is a first row quantized AC coefficient of the upper adjacent block (C) and $QP_C$ is a quantization scale of the upper adjacent block (C).

In Step 56, when the prediction block is a left adjacent block of the current block, the quantized AC coefficient $QF_X[v][0]$ equals to $PQF_X[v][0]+MP_A[v]//QP_X$, wherein $QF_X[v][0]$ is a first column quantized AC coefficient of the current block (X); when the prediction block is an upper adjacent block (C) of the current block, the quantized AC coefficient $QF_X[0][u]$ equals to $PQF_X[0][u]+MP_C[u]//QP_X$, wherein $QF_X[0][u]$ is a first row quantized AC coefficient of the current block (X). In both cases, the quantization scale $QP_X$ is a quantization scale of the current block. Also, $PQF_X[v][0]$ and $PQF_X[0][u]$ are inverse scan calculation results generated during a previous stage decoding process of the current block, and the operator // denotes a division operation with the result thereof rounded to the nearest integer.

Furthermore, one of the ways to implement the resetting of the prediction term of the quantized AC coefficient QF[v][u] as zero in Step 53 can be done by resetting either the prediction term ($MP_A[v]//QP_X$) or ($MP_C[u]//QP_X$) in the equation (i) or (ii) in Step 56 as zero. Considering this information, when resetting is executed in Step 53, the operation result of Step 56 can be described as follows. When the prediction block is a left adjacent block of the current block, the quantized AC coefficient $QF_X[v][0]$ equals to $PQF_X[v][0]$; when the prediction block is an upper adjacent block (C) of the current block, the quantized AC coefficient $QF_X[0][u]$ equals to $PQF_X[0][u]$.

Please refer to FIG. 6 again. With the above-mentioned video decoding method is provided, the present invention also accordingly provides a video decoding device 600 for predicting a current block (X) of a picture. As with the aforementioned method, the video decoding device 600 is described with at least one matrix element corresponding to indexes [v, u]. For the case that using a single matrix element is also one of the possible ways for the implementation of the present invention. The video decoding device 600 can also be implemented to perform with a plurality of matrix elements corresponding to indexes [v, u] to reach better decoding efficiency. The video decoding device 600 comprises a storage device (not shown in FIG. 6) for storing at least one previous product MP[v][u], wherein the previous product MP[v][u] corresponds to a block of a plurality of blocks of the picture, and the previous product MP[v][u] is the product between a quantized AC coefficient QF[v][u] and a quantization scale QP, QF[v][u]*QP, of the block that the previous product corresponds to.

The video decoding device 600 further comprises a divider 612 electrically connected to the storage device for reading at least one previous product $MP_A[v]$ or $MP_C[u]$ of a prediction block (A or C) from the plurality of blocks, for reading a quantization scale $QP_X$ of the current block, and for dividing at least one previous product of the prediction block by the quantization scale $QP_X$ of the current block to generate a quotient and a remainder corresponding to each of the at least one previous product. Furthermore, when the prediction block is a left adjacent block (A) of the current block, the at least one previous product read by the divider is a product $MP_A[v]=QF_A[v][0]*QP_A$ corresponding to the left adjacent block, wherein $QF_A[v][0]$ is a first column quantized AC coefficient of the left adjacent block (A) and $QP_A$ is a quantization scale of the left adjacent block (A); and when the prediction block is a upper adjacent block (C) of the current block, the at least one previous product read by the divider is a product $MP_C[u]=QF_C[0][u]*QP_C$ corresponding to the upper adjacent block, wherein $QF_C[0][u]$ is a first row quantized AC coefficient of the upper adjacent block (C) and $QP_C$ is a quantization scale of the upper adjacent block (C).

The video decoding device 600 further comprises a rounder 614 electrically connected to the divider 612 for converting the quotient into a rounded quotient according to the quotient and the remainder, and an adder 616 electrically connected to the rounder 614 for adding the rounded quotient with the inverse scan operation result generated during a previous decoding process of the current block to generate a summation $QF_X[v][0]$ or $QF_X[0][u]$. The summation is the first column quantized AC coefficient $QF_X[v][0]$ or the first row quantized AC coefficient $QF_X[0][u]$ of the current block. When the prediction block is a left adjacent block of the current block, the quantized AC coefficient $QF_X[v][0]$ equals to $PQF_X[v][0]+MP_A[v]//QP_X$, wherein $QF_X[v][0]$ is a first column quantized AC coefficient of the current block (X); when the prediction block is an upper adjacent block (C), the quantized AC coefficient $QF_X[0][u]$ of the current block (X) equals to $PQF_X[0][u]+MP_C[u]//QP_X$, wherein $QF_X[0][u]$ is a first row quantized AC coefficient of the current block (X). In both cases, the quantization scale $QP_X$ is a quantization scale of the current block. $PQF_X[v][0]$ and $PQF_X[0][u]$ are inverse scan calculation results generated during a previous stage decoding process of the current block, and the operator // denotes a division operation with the result thereof rounded to the nearest integer. In addition, the video decoding device 600 further comprises a saturator 618 electrically connected to the adder 616 for converting the summation $QF_X[v][0]$ or $QF_X[0][u]$ into a quantized AC coefficient $QF_X[v][u]$ of the current block by saturating the summation $QF_X[v][0]$ or $QF_X[0][u]$ within a predetermined numerical interval.

Step 50 and the generation of the previous product mentioned in the descriptions of the video decoding device 600 are further explained as follows. The video decoding device 600 further comprises a multiplier 630 electrically connected to the saturator 618 for multiplying a quantized AC coefficient $QF_X[v][u]$ by a quantization scale $QP_X$ to generate a current product by either of the following equations:

$MP_X[v][0]=QF_X[v][0]*QP_X$ (v=1~7 in this embodiment)

or $MP_X[0][u]=QF_X[0][u]*QP_X$ (u=1~7 in this embodiment)

wherein the current product corresponds to each quantized AC coefficient $QF_X[v][0]$ or $QF_X[0][u]$ of the current block. Furthermore, the current product either $MP_X[v][0]$ or $MP_X[0][u]$ is stored in the storage device for predicting other blocks of the picture. Therefore, after the storage of the products $MP_X[v][0]$ and $MP_X[0][u]$ corresponding to a decoded block of the picture is completed, the products $MP_X[v][0]$ or $MP_X[0][u]$ can be read during the decoding process of another block of the plurality of blocks of the picture that is to be decoded. And the first decoded block (the most upper-left block) of the picture can be decoded according to the boundary condition set by Step 53.

The aforementioned rearrangement of the internal operation order of the Inverse Quantization unit 144 in FIG. 1 is described as follows. Please refer to FIG. 7 showing a block diagram of the Inverse Quantization unit 700 according to the present invention. The Inverse Quantization unit 700 comprises an Inverse Quantizer 710 for performing an Inverse Quantization operation, a Saturator 762 electrically connected to the Inverse Quantizer 710 for performing a Saturation operation, and a Mismatch Controller 764 electrically connected to the Saturator 762 for performing Mismatch Control. As shown in FIG. 7, the quantized AC coefficients $QF[v][u]$ (such as the quantized AC coefficient $QF_X[v][u]$ shown in FIG. 6) inputted into the Inverse Quantization unit 700 through the decoding input 712 are respectively converted into second order intermediate coefficients $F'''[v][u]$, first order intermediate coefficients $F'[v][u]$, and DCT coefficients $F[v][u]$ respectively by the Inverse Quantizer 710, the Saturator 762, and the Mismatch Controller 764. In addition, the Inverse Quantizer 710 comprises the aforementioned multiplier 630 while the Saturator 762 and the Mismatch Controller 764 are well-known in the related art. According to the two quantization method: a first quantization method and a second quantization method specified in the MPEG4 (Moving Picture Experts Group/IV) specification, the operation order of the Inverse Quantizer 710 is described for these two quantization method respectively as follows.

The First Quantization Method

In the related art, the equation for transforming the quantized AC coefficients $QF[v][u]$ into the second order intermediate coefficients $F''[v][u]$ is:

$$F''[v][u] = \begin{cases} 0, & \text{if } QF[v][u] = 0 \\ ((2 \times QF[v][u] + k) \times W[w][v][u] \times QP)/16, & \text{if } QF[v][u] \neq 0 \end{cases} \quad (1)$$

$$\text{wherein } k = \begin{cases} 0, & \text{intra block} \\ \text{Sign}(QF[v][u]), & \text{non-intra block} \end{cases}$$

and the function Sign(x) is defined as Sign(x) =

$$\begin{cases} 1, & x >= 0 \\ -1, & x < 0 \end{cases}$$

wherein the index w of the weighted matrix $W[w][v][u]$ in the related art equals to 0 or 1. When a currently decoded macroblock of a picture is an intra coded macroblock, the weighted matrix $W[w][v][u]$ in the equation (1) is the weighted matrix $W[0][v][u]$; when the currently decoded macroblock is a non-intra coded macroblock, the weighted matrix $W[w][v][u]$ in the equation (1) is the weighted matrix $W[1][v][u]$. Multiplying the quantization scale QP in equation (1) with the first term $(2 \times QF[v][u]+k)$ in equation (1) results in the following.

$$F''[v][u] = \begin{cases} 0, & \text{if } QF[v][u] = 0 \\ ((2 \times QF[v][u] \times QP + k \times QP) \times W[w][v][u])/16, & \text{if } QF[v][u] \neq 0 \end{cases} \quad (2)$$

$$\text{wherein } k = \begin{cases} 0, & \text{intra block} \\ \text{Sign}(QF[v][u]), & \text{non-intra block} \end{cases}$$

Since the Inverse Quantizer 710 provided by the present invention stores the previous products MP[v][u], which are equal to QF[v][u]*QP, in advance, the equation (2) can result in the following:

$$F''[v][u] = \begin{cases} 0, & \text{if } QF[v][u] = 0 \\ ((2 \times MP[v][u] + k \times QP) \times W[w][v][u])/16, & \text{if } QF[v][u] \neq 0 \end{cases} \quad (3)$$

$$\text{wherein } k = \begin{cases} 0, & \text{intra block} \\ \text{Sign}(QF[v][u]), & \text{non-intra block} \end{cases}$$

wherein the calculation of the products MP[v][u] is completed by the aforementioned multiplier 630 before the Inverse Quantizer 710 performs the calculation of the second order intermediate coefficients F''[v][u].

The Second Quantization Method

In the related art, the equation for transforming the quantized AC coefficients QF[v][u] into the second order intermediate coefficients F''[v][u] is:

$$|F''[v][u]| = \begin{cases} 0, & \text{if } QF[v][u] = 0 \\ (2 \times |QF[v][u]| + 1) \times QP, & \text{if } QF[v][u] \neq 0 \text{ and } QP \text{ is odd} \\ (2 \times |QF[v][u]| + 1) \times QP - 1, & \text{if } QF[v][u] \neq 0 \text{ and } QP \text{ is even} \end{cases} \quad (4)$$

$$F''[v][u] = \text{Sign}(QF[v][u]) \times |F''[v][u]|$$

Multiply the quantization scale QP in equation (4) with the first term (2×|QF[v][u]|+1) in equation (4), resulting in the following:

$$|F''[v][u]| = \begin{cases} 0, & \text{if } QF[v][u] = 0 \\ (2 \times |QF[v][u]| \times QP + QP), & \text{if } QF[v][u] \neq 0 \text{ and } QP \text{ is odd} \\ (2 \times |QF[v][u]| \times QP + QP) - 1, & \text{if } QF[v][u] \neq 0 \text{ and } QP \text{ is even} \end{cases} \quad (5)$$

$$F''[v][u] = \text{Sign}(QF[v][u]) \times |F''[v][u]|$$

which then can be rearranged into the following.

$$|F''[v][u]| = \begin{cases} 0, & \text{if } QF[v][u] = 0 \\ (2 \times |QF[v][u] \times QP| + QP), & \text{if } QF[v][u] \neq 0 \text{ and } QP \text{ is odd} \\ (2 \times |QF[v][u] \times QP| + QP) - 1, & \text{if } QF[v][u] \neq 0 \text{ and } QP \text{ is even} \end{cases} \quad (6)$$

$$F''[v][u] = \text{Sign}(QF[v][u]) \times |F''[v][u]|$$

Since the Inverse Quantizer 710 provided by the present invention stores the previous products MP[v][u], which are equal to QF[v][u]*QP, in advance, the equation (6) can result in the following:

$$|F''[v][u]| = \begin{cases} 0, & \text{if } QF[v][u] = 0 \\ (2 \times |MP[v][u]| + QP), & \text{if } QF[v][u] \neq 0 \text{ and } QP \text{ is odd} \\ (2 \times |MP[v][u]| + QP) - 1, & \text{if } QF[v][u] \neq 0 \text{ and } QP \text{ is even} \end{cases} \quad (7)$$

$$F''[v][u] = \text{Sign}(QF[v][u]) \times |F''[v][u]|$$

wherein the calculation of the products MP[v][u] is completed by the aforementioned multiplier 630 before the Inverse Quantizer 710 performs the calculation of the second order intermediate coefficients F''[v][u].

To summarize, according to either the first quantization method or the second quantization method of the MPEG4 specification, the products MP[v][u] (such as the aforementioned previous product $MP_A$ or $MP_C$, the aforementioned at least one previous product is a subset of the products MP[v][u]) are those needed in the operation process (the aforementioned new Inverse Quantization process) of the Inverse Quantizer 710 of the present invention. Therefore, the goal of the present invention, reducing the operation amount (and corresponding calculation loading) relating to the Inverse DC and AC Prediction unit 143 in FIG. 1 is reached without any additional amount of operations (and corresponding calculation loading) being introduced in the present invention.

In another embodiment of the present invention, the method and related apparatus shown in FIG. 5 and FIG. 6 can be implemented with a pipeline-based circuit for performing pipeline operations. In said another embodiment, when the prediction block is a left adjacent block of the current block, the memory is a register of a pipeline-based circuit so while the decoding process of the left adjacent block of the current block is completed, the previous products (generated during the left adjacent block's decoding process) of the left adjacent block can be temporarily stored in the register for further calculation of the quantized AC coefficients of the current block. Therefore, storing the previous products of the left adjacent block into an external memory is unnecessary and the storing and writing time of the previous products can be reduced.

In contrast to the related art, the video decoding method and device of the present invention provide a better calculation order of the current block, so related calculation loading and time while decoding the current block are decreased to improve the decoding efficiency.

Another advantage of the present invention is that, the previous products used in the better calculation order of the embodiment are the same as those products corresponding to a previous decoded block (that is, the products generated while decoding the previous decoded block). Therefore, no additional calculation is required and the overall decoding time could be reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A video decoding method implemented in a video decoding device for predicting a current block of a picture comprising:
    storing at least one previous product in a memory, wherein the previous product corresponds to a block of a plurality of blocks of the picture, and the previous product is the product of a quantized AC coefficient and a quantization scale of the block that the previous product corresponds to;
    determining which block to use as a prediction block from the plurality of blocks;
    reading from the memory at least one previous product corresponding to the prediction block; and
    calculating at least one quantized AC coefficient of the current block using the at least one previous product read from the memory.

2. The method of claim 1 wherein each quantized AC coefficient is a discrete cosine transform coefficient corresponding to a quantization operation.

3. The method of claim 1 wherein the at least one previous product is generated during an inverse quantization operation of the block to which the previous product corresponds.

4. The method of claim 3 wherein each quantized AC coefficient is the quantized AC coefficient QF[v][u] corresponding to the indexes [v, u], the quantization scale is the quantization scale QP, and the method further comprises:

transforming the quantized AC coefficient QF[v][u] into a second order intermediate coefficient F″[v][u] during the inverse quantization operation using one of the following operation equations:

(a). a first quantization method:

$$F''[v][u] = \begin{cases} 0, & \text{if } QF[v][u] = 0 \\ ((2 \times MP[v][u] + k \times QP) \times W[w][v][u])/16, & \text{if } QF[v][u] \neq 0 \end{cases}$$

$$\text{wherein } k = \begin{cases} 0, & \text{intra block} \\ \text{Sign}(QF[v][u]), & \text{non-intra block} \end{cases}$$

wherein the index w of the weighted matrix W[w][v][u] is equal to 0 or 1, the values corresponding to an intra coded block and a non-intra coded block respectively, and the function Sign(x) is defined as follows:

$$\text{Sign}(x) = \begin{cases} 1, & x \geq 0 \\ -1, & x < 0 \end{cases}$$

;or (b). a second quantization method:

$$|F''[v][u]| = \begin{cases} 0, & \text{if } QF[v][u] = 0 \\ (2 \times |MP[v][u]| + QP), & \text{if } QF[v][u] \neq 0 \text{ and } QP \text{ is odd} \\ (2 \times |MP[v][u]| + QP) - 1, & \text{if } QF[v][u] \neq 0 \text{ and } QP \text{ is even} \end{cases}$$

$$F''[v][u] = \text{Sign}(QF[v][u]) \times |F''[v][u]|$$

wherein the product MP[v][u]=QF[v][u]*QP, the at least one previous product is a sub set of the products MP[v][u] with the indexes [v, u] varied, and the function Sign(x) is defined as follows:

$$\text{Sign}(x) = \begin{cases} 1, & x \geq 0 \\ -1, & x < 0 \end{cases}$$

5. The method of claim 1 wherein when the block determined to be used as the prediction block is outside a boundary of either a video object plane or a video packet corresponding to the picture, the method directly resets a prediction term of the quantized AC coefficient of the current block as zero to calculate the quantized AC coefficient of the current block rather than reading the at least one previous product of the prediction block from the memory.

6. The method of claim 1 wherein the prediction block is a left adjacent block or an upper adjacent block of the current block.

7. The method of claim 6 wherein when the prediction block is a left adjacent block of the current block, the memory is a register of a pipeline-based circuit.

8. The method of claim 1 wherein each quantized AC coefficient is the quantized AC coefficient QF[v][u] corresponding to the indexes [v,u], and the quantization scale is the quantization scale QP.

9. The method of claim 8 wherein when the prediction block is a left adjacent block (A) of the current block, the at least one previous product read is a product MPA[v] =QFA[v][0]*QPA corresponding to the left adjacent block, wherein QFA [v][0] is a first column quantized AC coefficient of the left adjacent block (A) and QPA is a quantization scale of the left adjacent block (A); and when the prediction block is a upper adjacent block (C) of the current block, the at least one previous product read is a product MPC[u]=QFC[0][u]*QPC corresponding to the upper adjacent block, wherein QFC [0][u] is a first row quantized AC coefficient of the upper adjacent block (C) and QPC is a quantization scale of the upper adjacent block (C).

10. The method of claim 9 wherein when the prediction block is a left adjacent block of the current block, the quantized AC coefficient QFX [v][0] of the current block (X) equals to PQFX [v][0]+MPA[v]//QPX, wherein QFX [v][0] is a first column quantized AC coefficient of the current block (X); when the prediction block is an upper adjacent block (C) of the current block, the quantized AC coefficient QFX [0][u] of the current block (X) equals to PQFX [0][u]+MPC[u]//QPX, wherein QFX [0][u] is a first row quantized AC coefficient of the current block (X); and the quantization scale QPX is a quantization scale of the current block, PQFX [v][0] and PQFX [0][u] are inverse scan calculation results generated during a previous stage decoding process of the current block, and the operator // denotes a division operation with the result thereof rounded to the nearest integer.

11. The method of claim 10 wherein the calculating step further comprises: calculating at least one first column quantized AC coefficient QFX[v][0] or at least one first row quantized AC coefficient QFX[0][u] of the current block using the at least one previous product MPA[v] or MPC[u] read; the method further comprises:

performing a saturation operation of the quantized AC coefficient QF [v][u], so the quantized AC coefficient QF [v][u] of the current block can be saturated in a predetermined numerical interval.

12. The method of claim 1 wherein the calculating step further comprises: calculating at least one first column quantized AC coefficient or at least one first row quantized AC coefficient of the current block using the at least one previous product read; the method further comprises:

performing a saturation operation of the quantized AC coefficient, so the quantized AC coefficient of the current block can be saturated in a predetermined numerical interval.

* * * * *

UNITED STATES PATENT AND TRADEMARK OFFICE
CERTIFICATE OF CORRECTION

PATENT NO. : 7,630,436 B2  
APPLICATION NO. : 10/711391  
DATED : December 8, 2009  
INVENTOR(S) : Chi-Cheng Ju Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this

Twenty-first Day of December, 2010

David J. Kappos  
*Director of the United States Patent and Trademark Office*